Patented June 12, 1951

2,556,454

UNITED STATES PATENT OFFICE 2,556,454

STIMULATION OF LACTIC CULTURES IN MILK

Arnold B. Storrs, Palos Heights, Ill., assignor to Armour and Company, Chicago, Ill., a corporation of Illinois No Drawing. Application March 18, 1948, Serial No. 15,722

7 Claims. (Cl. 99—59)

This invention relates to the stimulation of lactic cultures in milk for the production of lactic acid.

In cheese-making and in other fields, it is desirable to stimulate lactic acid cultures in milk to increase the production of lactic acid. The length of times required to "set" a curd in cheese-making and obtain the desired acid development can be reduced, for example, effecting a saving in labor costs. Likewise, a shorter incubation period with more vigorous development of the lactic culture, may frequently overcome the effects or stifle the development of undesirable types of bacteria.

The effect of sulfur dioxide and sulfites as inhibitors of the activity of cultures has heretofore been appreciated, but it has not been realized that such inhibiting materials might, when used in extremely small proportions, be effective for stimulating the activity of certain cultures. I have found that concentrations of sulfites up to about 0.001 molar have a stimulating effect upon the activity of lactic cultures in milk, while concentrations greater than 0.001 molar have a depressing effect, tending to inhibit bacterial growth of milk cultures. I have further found that the stimulating effect begins at about 0.0001 molar concentration, while the maximum stimulating effect seems to occur at about 0.0003 molar concentration.

By the term "sulfites," I mean sulfur dioxide and water-soluble alkali sulfites which produce $SO_2$, such as sodium sulfite, sodium bisulfite, potassium sulfite or bisulfite, ammonium and magnesium sulfite.

In one embodiment of the invention, sulfite in the desired amount is added to the milk which may then be cultured in the usual manner by the addition of the parent culture or starter, followed by a period of incubation to permit the bacterial cells to multiply. Aside from the addition of the sulfite, the procedure does not differ in any respect from the usual methods employed in culturing milk for the production of cheese or buttermilk.

The mechanism of the action of sulfites in this respect is not clearly understood although some possible explanations may be advanced. First, the sulfite ion itself, in sufficiently small concentration, may exert a growth-promoting action upon the bacteria. Also, the sulfites may combine with certain milk constituents to produce growth-promoting substances. Another possibility is that the sulfites may combine with naturally occurring inhibiting substances in the milk, and by thus removing them from the sphere of activity, allow the culture to develop and react more readily. It is believed that the latter method of action most closely fits the circumstances as now known.

As a means of regulating or improving culture activity, the use of sulfites will enable an operator to adjust the length of the incubation period within wider limits than has heretofore been possible, if such adjustment should be desirable. While the sulfites, in proper concentration, have stimulated all cultures tried to date, it has been observed that the effect is more pronounced with an old, relatively inactive culture than with a fresh culture. In other words, the activity of an old culture can be revived by sulfites so that it becomes comparable to that of a fresh culture.

The following may be set out as specific examples:

EXAMPLE I

Using 0.0002 molar sodium bisulfite, with a 10% culture inoculation and incubation at 90° F., a titratable acidity of 0.54% was developed in milk within four hours, whereas the control sample without sulfite developed only 0.37% acid in the same period. The culture employed in this case was old and relatively inactive.

EXAMPLE II

Using 0.0002 molar sodium bisulfite, with a 5% inoculation of fresh culture and incubation at 90° F., a tritratable acidity of 0.46% was developed in milk within 4 hours, whereas the control sample developed 0.34% acidity in the same period.

EXAMPLE III

Using 0.0004 molar sodium sulfite, with a 1% inoculation of fresh culture and incubation at 90° F., a titratable acidity of 0.39% was developed in milk within 6 hours, whereas the control sample under the same conditions required 7 hours for the same development.

EXAMPLE IV

Using a 1% inoculation of fresh culture and 7 hours incubation at 90° F., a titratable acidity was developed in a series of samples as follows:

| | Per cent |
|---|---|
| Control—no sulfite | 0.365 |
| 0.0001 molar sodium sulfite | 0.420 |
| 0.0002 molar sodium sulfite | 0.530 |
| 0.0004 molar sodium sulfite | 0.550 |
| 0.0008 molar sodium sulfite | 0.290 |

The following table indicates the percentage activity developed in samples of milk containing sulfite following the addition of lactic culture and incubation at 90° F.:

TABLE I

*Per cent acid developed in whole milk*

| Sulfite concentration (Molar) | B. C.[1] | Incubation Time, In Hours | | | | | | | |
|---|---|---|---|---|---|---|---|---|---|
| | | 0 | 1 | 2 | 3 | 4 | 5 | 6 | 7 |
| 0 | .147 | .176 | .182 | .194 | .213 | .236 | .273 | .326 | .402 |
| 0.00009 | .145 | .165 | .174 | .195 | .229 | .284 | .359 | .426 | .495 |
| 0.00018 | .146 | .181 | .194 | .228 | .277 | .359 | .428 | .529 | .589 |
| 0.00035 | .146 | .181 | .194 | .228 | .271 | .356 | .463 | .549 | .599 |
| 0.00075 | .152 | .185 | .188 | .200 | .216 | .247 | .304 | .394 | .469 |
| 0.00142 | .157 | .182 | .184 | .185 | .193 | .197 | .211 | .233 | .226 |
| 0.00286 | .171 | .191 | .191 | .188 | .180 | .194 | .196 | .201 | .170 |

[1] Before addition of culture.

While I have described the introduction of sulfur dioxide directly into the mixture of milk and culture, or indirectly thereinto, by the addition of a water-soluble sulfite to the mixture, it will be understood that the sulfur dioxide may be introduced by any method, and by the term "sulfur dioxide" as used in the claims herein, I intend to cover sulfur dioxide from any source, whether free, derived from a substance liberating sulfur dioxide in the product being treated, or supplied in any other way.

While, in the foregoing description, I have set forth a specific process with detailed steps, it will be understood that the details of operation may be varied widely by those skilled in the art without departing from the spirit of my invention.

I claim:

1. In a process for the stimulation of lactic cultures in milk for the production of lactic acid, the step of incorporating in the milk and culture mixture sulfur dioxide in the molar proportions of .0001 to .001 based on the total amount of liquid.

2. In a process for the stimulation of lactic cultures in milk for the production of lactic acid, the step of incorporating in the milk and culture mixture sulfur dioxide in the molar proportion of about .0003 based on the total amount of liquid.

3. In a cheese-making process in which lactic acid cultures are used, the steps of stimulating the lactic acid cultures in the milk by the addition thereto of sulfur dioxide in the molar proportions of .0001 to .001 based on the total amount of liquid.

4. In a cheese-making process in which lactic acid cultures are used, the steps of stimulating the lactic acid cultures in the milk by the addition thereto of sulfur dioxide in the molar proportion of about .0003 based on the total amount of liquid.

5. In a process for the stimulation of lactic cultures in milk, the steps of adding a water-soluble alkali sulfite to the mixture in the molar proportion of .0001 to .001 based on the total amount of liquid.

6. In a process for the stimulation of lactic cultures in milk, the steps of adding a water-soluble alkali sulfite to the mixture in the molar proportion of about .0003 based on the total amount of liquid.

7. In a process for the stimulation of lactic cultures in milk, the steps of adding sodium sulfite to the mixture in the molar proportion of .0001 to .001 based on the total amount of liquid.

ARNOLD B. STORRS.

REFERENCES CITED

The following references are of record in the file of this patent:

UNITED STATES PATENTS

| Number | Name | Date |
|---|---|---|
| 134,389 | Mefford | Dec. 31, 1872 |
| 327,023 | Sanborn | Sept. 29, 1885 |
| 1,197,442 | Burke et al. | Sept. 5, 1916 |
| 1,305,244 | Bacon | June 3, 1919 |

FOREIGN PATENTS

| Number | Country | Date |
|---|---|---|
| 322,081 | France | June 14, 1902 |
| 375,123 | France | Feb. 27, 1907 |

OTHER REFERENCES

"Disinfection and Preservation of Foods," by S. Rideal, published 1903. J. Wiley & Sons, N. Y. city, pages 131 to 135.